Figure 3A:
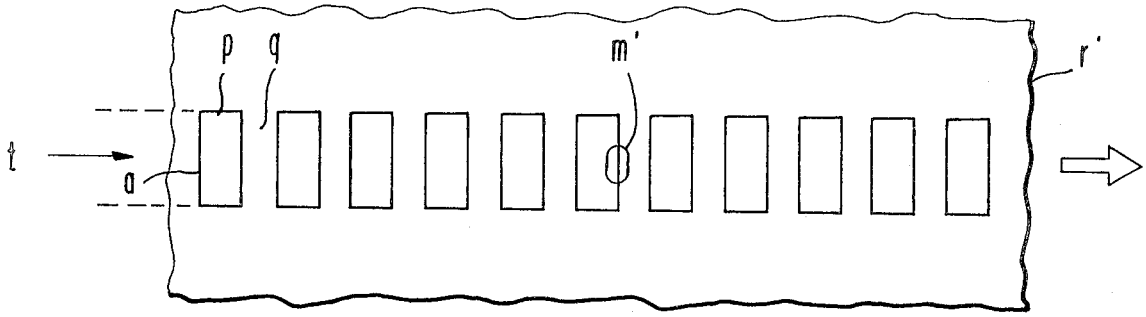
Figure 3B:
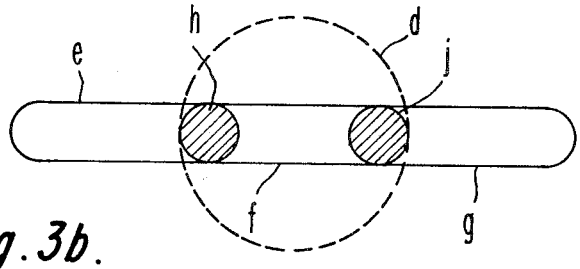
Figure 3C:
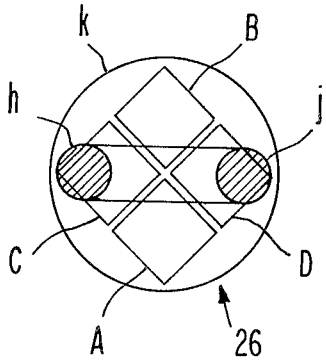
Figure 4:
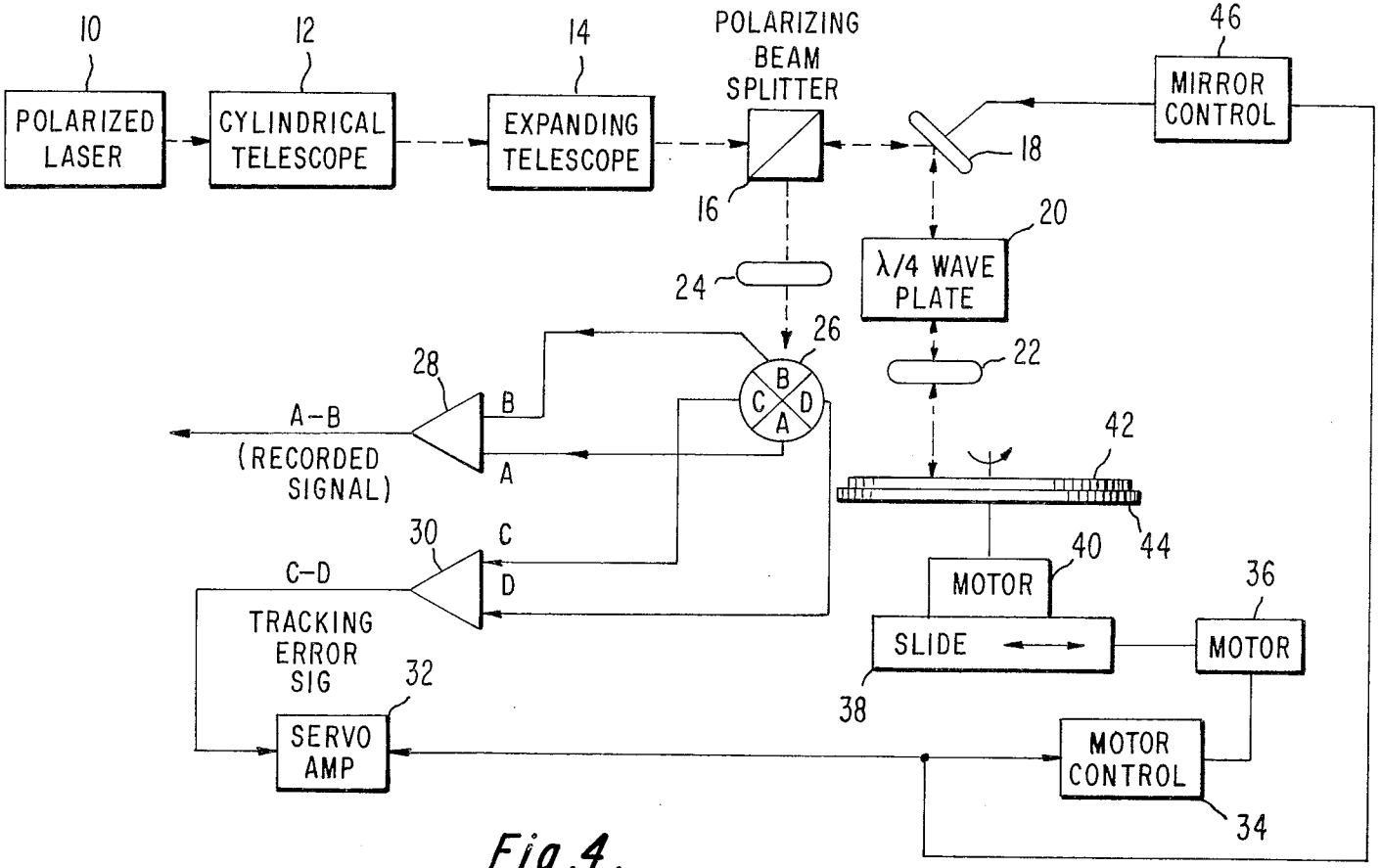

United States Defensive Publication [19] (H) [11] T953,002

Firester [43] Dec. 7, 1976

[54] OPTICAL VIDEODISC PLAYBACK SYSTEM WITH PLURAL PHOTODETECTORS

[75] Inventor: Arthur Herbert Firester, Skillman, N.J.

[73] Assignee: RCA Corporation

[21] Appl. No.: 618,246

[22] Filed: Sept. 30, 1975

[51] Int. Cl.[2] ..... H04N 5/76

[52] U.S. Cl. ..... 178/66 R; 178/6.6 DD; 178/6.7 A; 179/100.3 V; 179/100.3 G; 250/570

[57] ABSTRACT

An optical playback system is provided for a record having an information track comprising a succession of depressed areas alternating along the length of the information track with relatively non-depressed areas. Light is diffracted by the track to form a zero diffraction order cone of light, and a pair of differently deviated first diffraction order cones of light, each of the latter having a respective region of overlap with the zero diffraction order cone. A light detector, having four independent photosensitive elements disposed symmetrically about the center of a light accepting region of a common housing, is disposed in the path of the diffracted light so that the light accepting region intercepts the zero diffraction order cone. Two photosensitive elements detect two separate regions of overlap representing the recorded data. The remaining elements provide radial tracking signals. In one embodiment, the light beam is focused on the track as a circular light spot having a spot diameter greater than the track width, while in a second embodiment, the light beam is focused on the track as a substantially elliptical light spot having its major axis transverse to the track and its major axis dimension less than the track width.

5 Claims, 3 Sheets Drawing,

19 Pages Specification

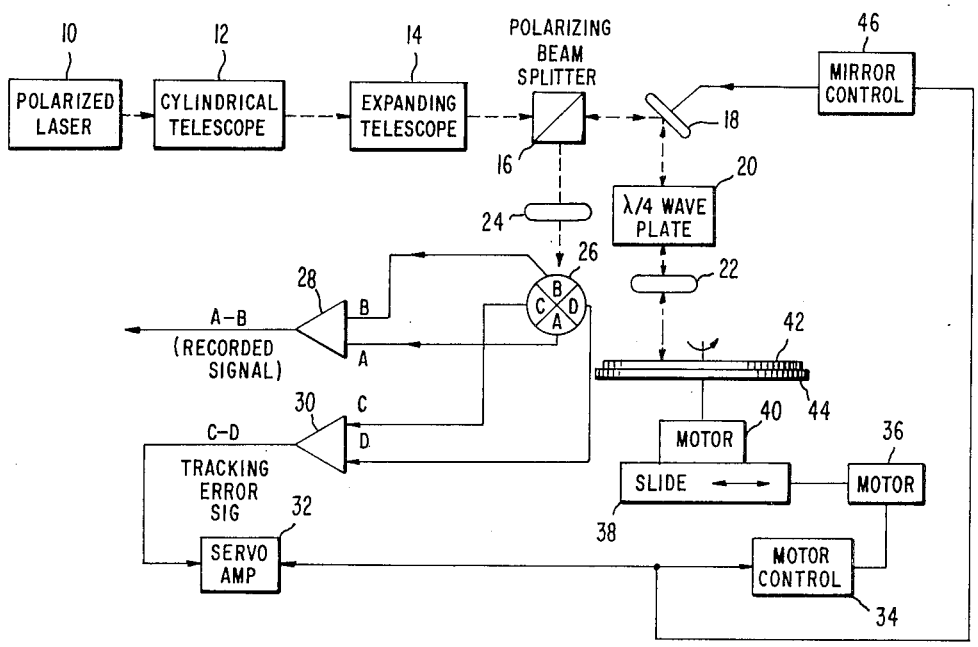

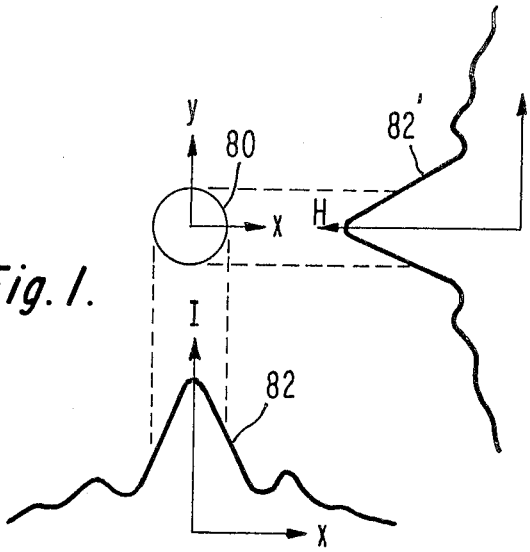
Fig. 1.
Fig. 2a.
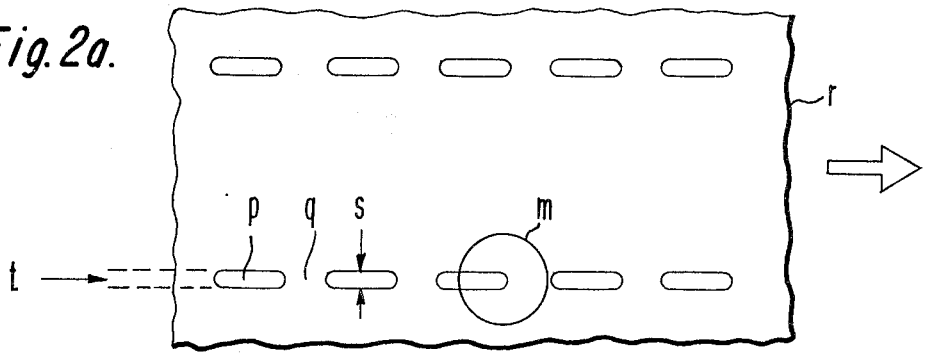
Fig. 2b.
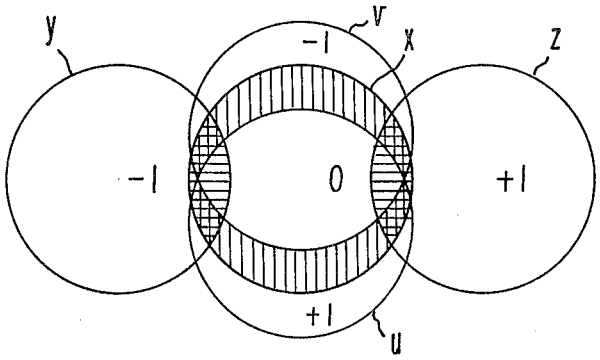
Fig. 2c.
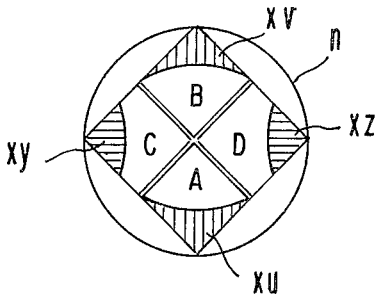

The file of this unexamined application may be inspected and copies thereof may be purchased (849 O.G. 1221, Apr. 9, 1968).